INVENTOR.
WALTER F. BONNER
BY
Robert Harding Jr
ATTORNEY

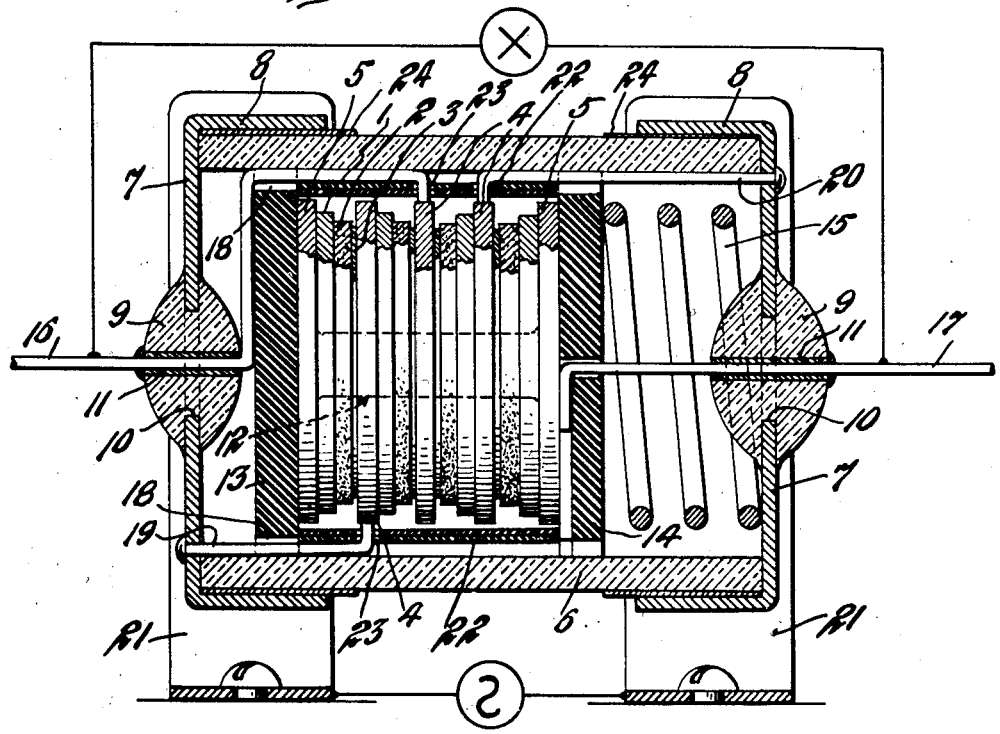
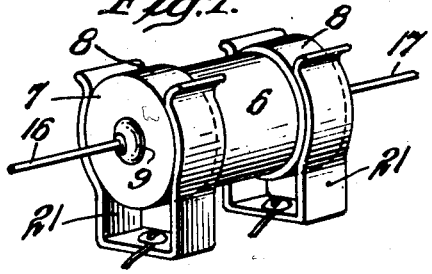
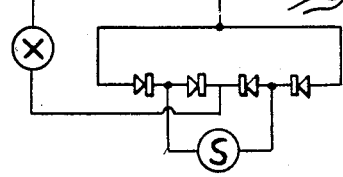
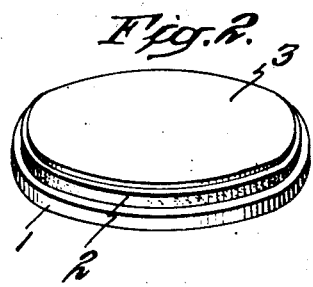
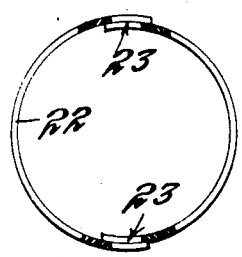
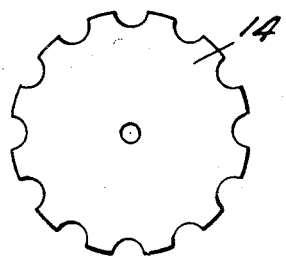
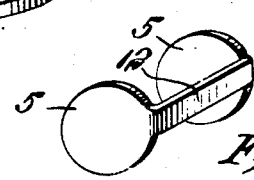
INVENTOR
WALTER F. BONNER
ATTORNEY Jan. 25, 1949.       W. F. BONNER       2,459,788
FULL WAVE RECTIFIER IN A GLASS
OR OTHER INSULATING CONTAINER
Filed Feb. 23, 1946       2 Sheets-Sheet 2

Patented Jan. 25, 1949

2,459,788

UNITED STATES PATENT OFFICE 2,459,788

FULL-WAVE RECTIFIER IN GLASS OR OTHER INSULATING CONTAINERS

Walter F. Bonner, Glen Ridge, N. J., assignor to Federal Telephone and Radio Corporation, New York, N. Y., a corporation of Delaware Application February 23, 1946, Serial No. 649,605

3 Claims. (Cl. 175—366)

This invention relates to multiple rectifier element assemblies of the metallic plate type, such as the well known selenium rectifier, wherein each rectifier element consists of a steel or aluminum supporting electrode upon which is adherently applied a layer of selenium suitably processed and provided with an overlying counter electrode alloy.

An object of the present improvements is to produce a stack assembly type rectifier unit which in accordance with certain of its features is designed for full wave rectification and which in its final assembly shall be a hermetically sealed unit of a cartridge type. To this end it is provided with end caps for sealing of the enclosure which likewise function as electrical terminals for contact and supporting engagement with standard form of resilient prong terminal clips. It further is of a simple and economical construction particularly adapted for small size rectifiers generally known as instrument rectifiers and designed for direct current energizing of meters and the like.

Features of the present improvements importantly contributing to the achievement of the foregoing objects include the assembly of the rectifier stack within a tubular container of insulating material provided with terminal caps for closure and electrical contact and wherein the caps are provided with inward hermetically sealed insulating supports for connecting wires or leads to the enclosed stack assembly to complete bridging circuit connections for full wave rectification.

A further object of the invention is to produce a stack assembly type rectifier unit of which certain features are so designated that the unit functions as a voltage doubler. Accordingly it is furnished with end caps for sealing and for electrical contact and with means for electrically connecting to a center cap. A feature of this embodiment is that only one of the end caps must be provided with inward hermetically sealed insulating supports, for connecting the center tap wire to the enclosed stack assembly.

In the preferred arrangement the tubular container may be of glass and the end caps are made of metal having inward insulating supports of glass molded therewith. The inward supports, through which the conducting leads are extended may desirably be molded with tubular or sleeve inserts through which the leads are passed for assembling and to which they are subseqently welded for hermetically sealing. The improvements further comprise a desirable and efficient structural arrangement providing for pre-assembly of the rectifier stack and insulating members and to facilitate insertion thereof within the container member with a spring for maintaining pressure contact so as to produce an efficient and fully dependable rectifying unit suitable for long period operation.

The foregoing and other features and advantages of the present invention will be more fully understood by reference to the accompanying drawings wherein like reference characters are applied to the corresponding parts in the several views.

In the drawings:

Fig. 1 is a perspective view of the improved cartridge type rectifier unit showing its manner of assembling with spring clip terminals of an input circuit;

Fig. 2 is a perspective view of one of the selenium type rectifier elements;

Fig. 3 is an enlarged central, longitudinal sectional view of the hermetically sealed rectifying unit made in accordance with the invention and wherein the rectifying elements and associated terminal clips are shown in elevation;

Fig. 4 is a diagram of the full wave bridging circuit arrangement;

Fig. 5 is a detail perspective view illustrating the united end terminal disc formation;

Fig. 6 is a view in vertical cross section of the inner sectional insulating sleeve;

Fig. 7 is a view in end elevation of the end insulating washer;

Figure 8:
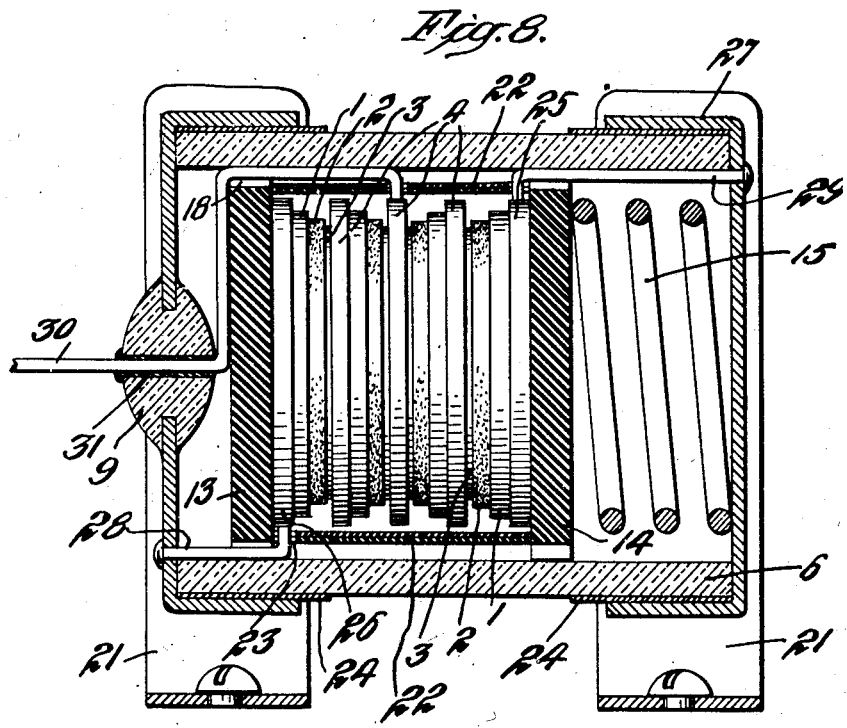
Fig. 8 is an enlarged central longitudinal sectional view of a hermetically sealed rectifying unit made in accordance with this invention, alternative to the embodiment illustrated in Figure 3 and being shown in association with terminal clips.

In the preferred embodiment of the invention as here illustrated the rectifier elements are of the well known selenium type consisting of supporting or plate electrodes 1 upon which is adherently applied a layer of selenium 2 which is pressure and heat treated for crystallization and over which is applied the counter electrode 3 of any suitable metal such as Woods alloy in conformance with customary practice. The rectifier elements as shown are of circular disc formation. In the stack assembly for full wave rectification as here shown, they are assembled with terminal or contact discs 4 of conducting metal interposed between the rectifier discs and with end terminal discs 5 in contact engagement with the outermost electrodes. In accordance with the bridging circuit arrangement as diagrammatically shown in Fig. 4 the rectifying elements at each side of the central terminal contact 4 are reversed in direction. The multiple rectifier elements in this stack assembly are positioned within a tubular container of insulating material, desirably of glass as indicated at 6 the ends of which are closed by metal caps having perforated end walls 7 and horizontal marginal flanges 8. The terminal caps in accordance with the invention are made of metal having inner centrally positioned insulators 9 formed of glass molded therewith to close the central openings 10 formed in the wall 7 and within which are molded metal sleeves 11 axially positioned.

For convenience in assembling of the rectifying elements the end terminals 5—5 are formed in one piece with a bridge connection 12 as best shown in Fig. 5 providing the required electrical connection therebetween. The double terminal contact 5—5 provides a temporary or pre-assembly holder for the rectifier stack facilitating visible assembly of the parts as will be readily understood. The stack is inserted within the tubular container with insulating washers 13 and 14 positioned in engagement with the stack end contact discs 5 and with a coiled compression spring 15 confined between the washer 14 and the associated end cap.

The circuit leads or wires to the respective terminal contacts for full wave rectification include in the circuit arrangement as disclosed, the output leads 16 and 17 passing axially through the sleeves 11 supported by the insulators 9. The wire 16 is passed through a marginal recess 18 in the washer 13 with its inner end welded to the central terminal contact disc 4. The opposite output lead 17 is similarly passed through the sleeve of insulator 9 and has its inner end portion passed through a central aperture of washer 14 with a welding connection to the dual outermost terminal disc member 5—5 thereby connecting the discs 5—5 in parallel to one of the output leads. The terminal caps 8 are each electrically connected to intermediate terminal contact discs 4 at its associated side of the central terminal contact. This connection for the left hand terminal cap is by a conductor wire 19 extended outwardly through a hole in the cap and passing inwardly through marginal opening 18 of the washer and connected as shown to the intermediate terminal disc 4 by welding. A similar connection to the opposite cap is made by conductor wire 20 welded at its inner end to an intermediate terminal contact 4 and passing through an aperture in the cap as indicated. The input circuit as accordingly completed through the intermediate terminal contacts upon the mounting of the rectifier unit within the standard resilient terminal mounting clips 21 supported to be engaged by the caps 8 and connected to opposite sides of the A. C. input leads as diagrammatically shown.

Suitable insulation is provided to surround the stack assembly and positioned to underlie the horizontal extensions of the connecting wires 19 and 20. As best shown in Fig. 6 this insulation may be in a form of a longitudinally split sleeve 22 the sections of which have enlarged marginal edge openings 23 for the passage of the wire ends therethrough with a slight clearance for allowable compression of the stack. This structure facilitates the pre-assembly of the insert parts with the conductor wires axially extended. An alternate means of suitably insulating is to insulate the wires 16, 17, 19, and 20 directly and also the bridge connection 12, thus doing away with the sleeves 22. The assembly is then made by threading the conductors through the caps after which the leads 19 and 20 are cut and externally welded to the caps thereby sealing the openings and the projecting central leads 16 and 17 are likewise externally welded as indicated to the sleeves 11 likewise providing a hermetic seal. The unit is then completed by welding of the inner edges of the cap flanges 8 to a silver coating 24 applied to the surface of the tubular container. The dual end contact member 5—5 made of relatively thin copper is sufficiently resilient to permit the required degree of compression of the stack for maintaining good electrical contact.

Figure 9:
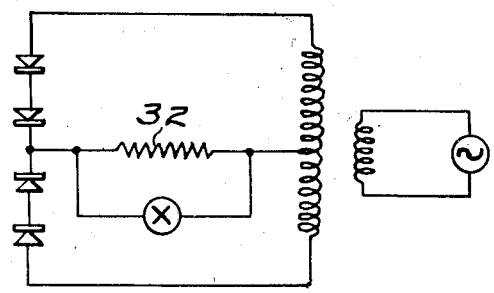
Fig. 9 is a diagram of the voltage double circuit.

A further embodiment of the invention is illustrated in Fig. 8. The stack assembly is used as a voltage doubler. In this embodiment the double contact terminal 5—5 is not formed in one piece and the bridge connection 12, as shown in Fig. 5, is omitted. In Fig. 8 the end plates 25 and 26 are separated and they are each connected to the terminal cap 27 which is adjacent to it. Connections are made by means of wires 28 and 29 that are similar to wires 19 and 20 shown in Fig. 3. As Fig. 8 clearly shows, only one output lead is necessary and one of the insulating sleeves corresponding to the insulators 9 in Fig. 3 has been omitted. The output lead 30 from the center disc of the rectifier unit corresponds exactly to the wire 18 of Fig. 3 and it passes through the insulating sleeve 31 in an analogous manner. The unit functions as a three terminal rectifier and it may be connected to a transformer with a center tap, as shown in Fig. 9. The alternating current is applied across the outside terminals of the transformer. The trigger voltage is tapped off the resistance 32 connected between the center tap of the rectifier unit and that of the transformer. The advantage in using this embodiment, as described herein and illustrated in Figs. 8 and 9, is that only one insulating sleeve is required.

The structural arrangement as described provides a hermetically sealed rectifier unit of the cartridge type which is simple and economical in construction and by reason of its protective features is more durable in its operation particularly in most atmospheres such as in the tropics. While a preferred embodiment of the features of the invention is shown, it will be understood that varied modification may be made therein without departing from the scope of the invention as defined in the appended claims. While the rectifier elements are referred to, and preferably are of the selenium dry plate type, it will be understood that other equivalent type of rectifier elements may be employed therewith if desired.

What is claimed is:

1. In a cartridge type electric current rectifying element of the type that comprises a stack of rectifier elements, a plurality of electrical conductors connected to certain elements of said stack; the improvements that comprise a tubular casing, open at the ends, formed of electrical insulating material and adapted to receive and surround said stack with the conductors extending at least to the ends of said casing, said casing being provided with two external annular silver coatings integral therewith, one located near each end thereof; metallic cup-like terminal caps, one on each end of said casing, overlying and hermetically united with the adjacent external annular silver coating on the casing in a manner precluding rotation of the cap relative to the casing, each of said caps being connected to one of said conductors; at least one of said caps having a centrally located opening formed therein, an insulative bead mounted in said opening and hermetically joined to the margin thereof, a metallic sleeve, open at the ends, mounted in said bead without contact with the cap in which the bead is positioned and extending in a direction substantially coaxial with the casing, whereby one of the conductors connected to the rectifier stack extends through and is hermetitcally sealed to said sleeve to provide an additional external terminal of the rectifier.

2. A rectifier element as defined in claim 1 wherein the additional external terminal is provided at both ends of the rectifier cartridge.

3. A rectifier element as defined in claim 1 wherein the casing and insulative bead are formed of a vitreous electrically insulative material.

WALTER F. BONNER.

REFERENCES CITED

The following references are of record in the file of this patent:

UNITED STATES PATENTS

| Number | Name | Date |
|---|---|---|
| 1,649,741 | Ruben | Nov. 15, 1927 |
| 1,908,800 | Utne | May 16, 1933 |
| 2,071,597 | Vasselli | Feb. 23, 1937 |
| 2,121,590 | Espe | June 21, 1938 |
| 2,383,735 | Ray | Aug. 28, 1945 |
| 2,408,052 | Enderlin | Sept. 24, 1946 |